(12) United States Patent
Trice et al.

(10) Patent No.: US 12,736,228 B2
(45) Date of Patent: Sep. 15, 2026

(54) MICROWAVE COOKING APPLIANCE HAVING A CONNECTOR SYSTEM FOR AN EXTERNAL VENT

(71) Applicant: Midea Group Co., Ltd., Beijiao (CN)

(72) Inventors: Daniel J. Trice, Louisville, KY (US); Brian Langness, Shelbyville, KY (US); Eric Scalf, Louisville, KY (US)

(73) Assignee: MIDEA GROUP CO., LTD., Beijiao (CN)

( * ) Notice: Subject to any disclaimer, the term of this patent is extended or adjusted under 35 U.S.C. 154(b) by 558 days.

(21) Appl. No.: 17/353,647

(22) Filed: Jun. 21, 2021

(65) Prior Publication Data

US 2022/0404030 A1 Dec. 22, 2022

(51) Int. Cl.
*F24C 15/20* (2006.01)
*F16B 1/00* (2006.01)
*H05B 6/64* (2006.01)

(52) U.S. Cl.
CPC ............ *F24C 15/2007* (2013.01); *F16B 1/00* (2013.01); *F24C 15/2078* (2013.01); *H05B 6/6402* (2013.01); *F16B 2200/83* (2023.08)

(58) Field of Classification Search
CPC .... F24C 15/2007; F24C 15/2078; F16B 1/00; F16B 2200/83; H05B 6/6402; H05B 6/642; H05B 6/6429
See application file for complete search history.

(56) References Cited

U.S. PATENT DOCUMENTS 2,739,521 A 3/1956 Spear
3,627,248 A 12/1971 Nelson
3,643,646 A * 2/1972 Honaker, Jr. ........... F23L 17/04 126/307 R
3,804,211 A 4/1974 Scherzinger
3,814,363 A 6/1974 Brelosky
3,954,244 A 5/1976 Gopstein
3,970,273 A 7/1976 Tanner
4,012,058 A 3/1977 Patton
4,313,043 A * 1/1982 White ................. F24C 15/2042 219/757

(Continued)

FOREIGN PATENT DOCUMENTS

AT 411925 B 7/2004
CN 1704653 A * 12/2005

(Continued)

OTHER PUBLICATIONS

Master Flow Duct, http://www.homedepot.com/p/Master-Flow-3-1-4-in-x-10-in-Rectangular-Stack-Duct-Starting-Collar-SCF3-25X10/100139382?N=c5hh (Year: 2017).*

(Continued)

*Primary Examiner* — Steven W Crabb
*Assistant Examiner* — Thao Uyen Tran-Le
(74) *Attorney, Agent, or Firm* — Gray Ice Higdon

(57) ABSTRACT

A microwave cooking appliance having a connector system connecting the appliance to an external vent configuration. The connector system may include an adaptor. The connector system may include a mounting bracket to mount the microwave cooking appliance. The adaptor and/or mounting bracket may include one or more magnets to magnetically connect the adaptor with the mounting bracket. The connector system may include a sealing system.

20 Claims, 6 Drawing Sheets

(56) References Cited

U.S. PATENT DOCUMENTS 4,327,274 A 4/1982 White et al.
4,453,690 A 6/1984 Takeuji
4,457,436 A 7/1984 Kelley
4,465,256 A 8/1984 Wolbrink et al.
4,580,853 A 4/1986 Hitzeroth et al.
4,584,986 A 4/1986 Cannata
4,635,615 A 1/1987 Itoh et al.
4,659,047 A 4/1987 Haller
4,666,113 A 5/1987 Itoh et al.
4,720,622 A * 1/1988 Iwata ...................... F24C 15/30 219/391
4,753,406 A 6/1988 Kodama et al.
4,795,121 A 1/1989 Comito
4,796,850 A 1/1989 Aramaki
4,824,061 A 4/1989 Sumikama et al.
4,898,149 A 2/1990 Cohn
5,014,945 A 5/1991 Miller
5,096,230 A 3/1992 Pausch et al.
5,257,468 A 11/1993 Lebrun
5,318,328 A 6/1994 Dawson
5,482,232 A 1/1996 Wynn
5,590,641 A 1/1997 Duong
5,676,440 A 10/1997 Garber et al.
6,018,158 A * 1/2000 Kang .................. H05B 6/6423 219/757
6,222,171 B1 4/2001 Fukuda et al.
6,341,754 B1 1/2002 Melito et al.
6,369,372 B1 4/2002 Kim
6,512,214 B2 1/2003 Jeong et al.
6,554,880 B1 4/2003 Northcutt
6,584,702 B2 7/2003 Irey
6,660,984 B1 12/2003 Jeong et al.
6,737,622 B1 5/2004 Jeong et al.
6,894,259 B2 5/2005 Lee
6,894,260 B2 5/2005 Yamauchi
7,030,348 B1 4/2006 Kim
7,129,452 B2 10/2006 Cho
7,282,683 B2 10/2007 Yamauchi et al.
7,348,527 B2 * 3/2008 Braunisch ............ H05B 6/6423 219/757
9,243,734 B2 1/2016 Aubert et al.
9,523,507 B2 * 12/2016 Bruin-Slot .......... F24F 13/0254
9,719,251 B2 8/2017 Gosling
9,897,330 B2 2/2018 Bruin-Slot et al.
9,897,331 B2 2/2018 Bruin Slot
10,018,365 B2 7/2018 Bruin-Slot et al.
10,145,054 B2 12/2018 Federico
10,197,202 B2 2/2019 Vasquez
10,302,308 B2 5/2019 Peng
10,317,093 B2 6/2019 Bruin-Slot et al.
10,539,329 B2 1/2020 Gauthier et al.
10,633,783 B1 * 4/2020 Kelley .................... D06F 58/20
10,660,438 B2 5/2020 Hognaland
10,663,175 B2 5/2020 Jang
10,709,240 B2 7/2020 Hira et al.
11,460,193 B2 10/2022 Gayakwad
2005/0052018 A1 3/2005 Pichotta
2005/0178763 A1 * 8/2005 Yamauchi .............. H05B 6/642 219/757
2009/0252548 A1 10/2009 Laible
2016/0003270 A1 * 1/2016 Franklin ................ H01R 13/70 439/529
2016/0195279 A1 7/2016 Naber
2016/0341432 A1 11/2016 Sinur
2017/0065077 A1 3/2017 Behroozi
2018/0192807 A1 7/2018 Hall
2018/0340695 A1 * 11/2018 Park .................... F24C 15/2007
2019/0113241 A1 * 4/2019 Zhang .................. H05B 6/6423
2019/0203881 A1 7/2019 Wu
2019/0223593 A1 * 7/2019 Hira ....................... A47B 77/12
2020/0224676 A1 7/2020 Gazerro
2020/0292291 A1 9/2020 Duz
2020/0373743 A1 11/2020 Chambers
2022/0141927 A1 5/2022 Scalf et al.
2022/0400850 A1 12/2022 Trice
2022/0400860 A1 12/2022 Trice
2022/0404031 A1 12/2022 Trice
2023/0404260 A1 12/2023 Trice et al.
2024/0147584 A1 5/2024 Scalf

FOREIGN PATENT DOCUMENTS

CN 108344018 A 7/2018
CN 210241107 U 4/2020
DE 3839931 A1 5/1990
DE 4340255 A1 6/1995
DE 10128026 A1 12/2002
DE 10357575 A1 7/2004
DE 102005057153 A1 5/2007
DE 102005057160 A1 5/2007
DE 102010055986 A1 5/2012
EP 0130029 A1 1/1985
GB 2142669 A 1/1985
KR 880000748 Y1 3/1988
KR 880002241 Y1 6/1988
KR 19980030344 U 8/1998
KR 19980030345 U 8/1998
KR 19980036833 U 9/1998
KR 19980045009 U 9/1998
KR 19990032462 A 5/1999
KR 20000010025 A 2/2000
KR 100244311 B1 3/2000
KR 20010055487 A 7/2001
KR 200271639 Y1 4/2002
KR 20030059878 A 7/2003
KR 200322075 Y1 * 8/2003 ........... H05B 6/6426
KR 20070065133 A 6/2007
KR 20080057729 A 6/2008
KR 20110002949 U 3/2011
WO WO2017037247 A1 3/2017
WO WO-2019001476 A1 * 1/2019 ........... H04B 1/3816

OTHER PUBLICATIONS

Salone, Bayan, United States Patent and Trademark Office, Notice of Allowance issued in U.S. Appl. No. 17/353,654, 150 pages, dated Apr. 10, 2024.

Fulton Store, Side Mount Heavy Duty Steel Furniture Leg Leveling Feet, Adjustable Height with Round Foot Ideal for Desks, Tables, Shelving Units, Shop Cabinets and Furniture, retrieved from: https://www.amazon.com/Adjustable-Furniture-Levelers-Shelving-Cabinets/dp/B06ZXSXL5Z, Retrieved on: Jun. 9, 2023.

Mason Ind., 20,000 lb Capacity, 3-½ Wide×6" Long, ½" Pad, Wedge Jack, retrieved from: https://www.mscdirect.com/product/details/88000906; Retrieved on: Jan. 30, 2023.

Wobble Wedges Store, Wobble Wedge BigGap Rigid Plastic Shims, Multipurpose Wdges for Home Improvement & Work, Leveling Pads for Large Gaps & Heavy Loads, Furniture Appliance Levelers, Retrieved from: https://www.amazon.com/Wobble-Wedges-BigGap-Plastic-Shims/dp/B08KVV6JRM?th=1; Retrieved on: Jan. 30, 2023.

Namay, Daniel Elliot, Non-Final Ofice Action issued in U.S. Appl. No. 17/353,671, 218 pages, dated Jan. 18, 2024.

Majestic, Majestic BKTLA7C LED TV Wall Mount Slide Bracket for Easy TV Removal, Retrieved from: https://majesticelectronics.us/tv-mounts/16-majesetic-bktla7c-led-tv-wall-mount-bracket-easy-remove.html , Retrieved on Oct. 27, 2020.

Magvent, Mag Vent Dryer Vent, Retrieved from: https://www.magvent-dryervent.com/, Retrieved on Apr. 7, 2021.

Mag Vent, Mag Vent MV-90 Magnetic Dryer Vent Coupling, Amazon.com, Retrieved from https://www.amazon.com/Mag Vent-MV-90-Magnetic-Dryer-Coupling/dp/B013TI7A4S, Retrieved on Dec. 9, 2020.

Nardi, Tom, 3D Printed Magnetic Dust Port Keeps Shop Clean, Hackaday, Aug. 29, 2018.

Transmittal of Related Applications dated Jun. 22, 2021.

Bargero, John E., United States Patent and Trademark Office, Non-Final Office Action issued in U.S. Appl. No. 17/353,666, 53 pages, dated Nov. 6, 2023.

(56) References Cited

OTHER PUBLICATIONS

Sterling, Amy Jo., United States Patent and Trademark Office, Notice of Allowance issued in U.S. Appl. No. 17/089,196, 46 pages, dated Aug. 2, 2023.

Bargero, John E., United States Patent and Trademark Office, Final Office Action issued in U.S. Appl. No. 17/353,666, 36 pages, dated May 14, 2024.

Bargero, John E., United States Patent and Trademark Office, Non-Final Office Action issued in U.S. Appl. No. 17/353,666, 40 pages, dated Sep. 29, 2024.

Salone, Bayan, United States Patent and Trademark Office, Notice of Allowance issued in U.S. Appl. No. 18/210,983, 71 pages, dated Sep. 30, 2024.

Sterling, Amy Jo, United States Patent and Trademark Office, Non-Final Office Action issued in U.S. Appl. No. 18/400,809, 54 pages, dated Nov. 12, 2024.

* cited by examiner 1
2
44
41
43
16
14
15
48
90
45
42
36
39
20
34
48
41b
33
37
43
61
41a
16
160
62
30
44
40
18
17
10
12

MICROWAVE COOKING APPLIANCE HAVING A CONNECTOR SYSTEM FOR AN EXTERNAL VENT

CROSS-REFERENCE TO RELATED APPLICATIONS

This application is related to the following applications, each of which is filed on even date herewith and assigned to the same assignee as the present application: U.S. patent application Ser. No. 17/353,654 entitled “Mounting Bracket Assembly for Appliance”; U.S. patent application Ser. No. 17/353,666 entitled “Mounting Bracket for Over-the-Range Cooking Appliance”; and U.S. patent application Ser. No. 17/353,671 entitled “Mounting Bracket for Over-the-Range Cooking Appliance with Drill Guide”. The disclosures of each of these applications are incorporated by reference herein.

BACKGROUND

The present embodiments relate to a microwave cooking appliance having a connector system for an external vent.

Typical microwave cooking appliances may have a front vent for recirculated air and/or a top vent or rear vent configuration for venting. In the top vent and rear vent configurations, the integrated exhaust of the microwave cooking appliance body is attempted to be positioned in communication with the external vent. It can be difficult to connect the appliance body’s exhaust to the external vent when installing the microwave because of the lack of accessibility to the external vent and inability to see the alignment with the external vent because of the body of the microwave appliance or surroundings inhibit the installer/user. Thus, there is a need for easier installation, proper alignment between the microwave cooking appliance exhaust and the external vent, and proper venting to the outside.

SUMMARY

In some embodiments of the invention, for example, a connector system for a microwave cooking appliance to an external vent may comprise a mounting bracket adapted to mount a microwave cooking appliance. In various embodiments, the mounting bracket may include a magnetic body. In some embodiments, the magnetic body may include at least one vent opening to engage an exhaust of the microwave cooking appliance. In various embodiments, the connector system may include an adaptor having a first end and an opposing second end. In some embodiments, the adaptor may include a through opening extends through the first end and the second end. In various embodiments, the adaptor may include one or more magnets. In some embodiments, the one or more magnets may be adjacent the first end of the adaptor and releasably engage the magnetic body of the mounting bracket and/or the second end of the adaptor may be configured to engage an external vent. In some embodiments, when the adaptor is engaged with the mounting bracket the through opening of the adaptor may be in fluid communication with at least one vent opening of the mounting bracket.

In some embodiments, the connector system may include at least one gasket, wherein at least one gasket may surround at least one vent opening and may be positioned between the mounting bracket and the microwave cooking appliance. In various embodiments, the adaptor may include a plastic body with the one or more magnets positioned therein. In some embodiments, the connector system may include at least one damper positioned within the through opening of the adaptor. In some embodiments, the connector system may include a flange projecting from the adaptor and engaging a periphery of at least one vent opening of the mounting bracket. Moreover, in some embodiments, the flange projecting from the adaptor may include a first chamfered periphery and wherein the periphery of at least one vent opening of the mounting bracket may include a second chamfered periphery. In some embodiments, when the adaptor is engaged with the mounting bracket the first chamfered periphery and the second chamfered periphery align to orient the adaptor relative to the mounting bracket. In various embodiments, the adaptor may include a plate, wherein the plate may include a sleeve extending away from the plate towards the first end and may be adapted to engage the external vent and a flange extending away from the plate towards the second end and may be adapted to engage the mounting bracket. In some embodiments, the plate includes the one or more magnets.

In various embodiments, a microwave cooking appliance may have a connector system. In some embodiments, the microwave cooking appliance may include a microwave bracket and/or an adaptor. In various embodiments, the microwave cooking appliance may have an exhaust. In some embodiments, the mounting bracket may be adapted to mount the microwave cooking appliance. In various embodiments, the mounting bracket may include a magnetic body defining at least one vent opening to engage the exhaust of the microwave cooking appliance. Moreover, in some embodiments, the adaptor may have a plate, a sleeve, and/or a flange defining a through opening. In some embodiments, the sleeve may project from the plate towards an external vent and the flange may project away from the plate towards the mounting bracket. In some embodiments, the plate may include one or more magnets. In various embodiments, the one or more magnets may releasably engage the magnetic body of the mounting bracket. In various embodiments, the sleeve of the adaptor may be configured to engage the external vent. In addition, in some embodiments, when the adaptor is engaged with the mounting bracket the exhaust of the microwave cooking appliance is in fluid communication with the external vent via the through opening of the adaptor and at least one vent opening.

In addition, in some embodiments, the microwave cooking appliance may include at least one gasket, wherein at least one gasket surrounds at least one vent opening and may be positioned between the mounting bracket and the microwave cooking appliance. In various embodiments, the adaptor may include a plastic body with the one or more magnets positioned therein. In some embodiments, the microwave cooking appliance may include at least one damper positioned within the through opening of the adaptor. In some embodiments, the flange may engage a periphery of at least one vent opening of the mounting bracket. In various embodiments, the flange projecting from the plate may include a first chamfered periphery and wherein the periphery of at least one vent opening of the mounting bracket may include a second chamfered periphery, and when the adaptor is engaged with the mounting bracket the first chamfered periphery and the second chamfered periphery align to orient the adaptor relative to the mounting bracket. In some embodiments, the plate may include the one or more magnets positioned outside a periphery of the flange.

In some embodiments, a method of connecting an external vent to a microwave cooking appliance may include providing a microwave cooking appliance having an exhaust. In various embodiments, the method may include providing an external vent in at least one of a wall or a cabinet. In some embodiments, the method may include providing an adaptor having a through opening and one or more magnets positioned about the through opening. In various embodiments, the method may include attaching the adaptor to the external vent. In some embodiments, the method may include providing a mounting bracket having a magnetic body defining at least one vent opening. In some embodiments, the method may include decreasing the proximity between the mounting bracket and the adaptor to engage the mounting bracket with the one or more magnets of the adaptor thereby aligning the through opening with at least one vent opening. Moreover, in various embodiments, the method may include attaching the mounting bracket to at least one of the wall or the cabinet. In some embodiments, the method may include mounting the microwave cooking appliance to the mounting bracket thereby aligning the exhaust with the through opening of the adaptor.

In addition, in some embodiments, the method may include sealing the microwave cooking appliance to the mounting bracket with a gasket positioned between the microwave cooking appliance and the mounting bracket. In some embodiments, the method may include orientating the adaptor relative to the mounting bracket. In various embodiments, the method may include selecting a top vent configuration or a rear vent configuration to attach the adaptor relative to at least one vent opening of the mounting bracket. In some embodiments, the method may include centering the through opening of the adaptor relative to at least one vent opening with one or more flanges engaging a periphery of at least one vent opening. In some embodiments, attaching the adaptor to the external vent may include telescoping a portion of the adaptor with a portion of the external vent.

These and other advantages and features, which characterize the embodiments, are set forth in the claims annexed hereto and form a further part hereof. However, for a better understanding of the embodiments, and of the advantages and objectives attained through its use, reference should be made to the Drawings and to the accompanying descriptive matter, in which there is described example embodiments. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Numerous variations and modifications will be apparent to one of ordinary skill in the art, as will become apparent from the description below. Therefore, the invention is not limited to the specific implementations discussed herein.

The embodiments discussed hereinafter will focus on the implementation of the hereinafter-described techniques and apparatuses within a microwave cooking appliance, such as the type that may be used in single-family or multi-family dwellings, or in other similar applications. However, it will be appreciated that the herein-described techniques may also be used in connection with other types of microwave cooking appliances in some embodiments. For example, the herein-described techniques may be used in commercial applications in some embodiments.

Turning now to the drawings, wherein like numbers denote like parts throughout the several views, FIGS. 1-6 illustrate an example microwave cooking appliance 10 in which the various technologies and techniques described herein may be implemented to fluidly connect to an external vent. Microwave cooking appliance 10 is a residential-type microwave cooking appliance, and as such includes a housing or enclosure 12, which further includes a cooking cavity, as well as a door 13 to form a portion of the cooking cavity. The door 13 may be disposed adjacent a front side of the cooking cavity, appliance 10, or housing 12. The door 13 may be movable or positionable between a closed position (FIG. 1) closing a front opening of the housing 12/cooking cavity to define a portion of the cooking cavity. The open positon, not shown, is different from the closed position.

Figure 1:
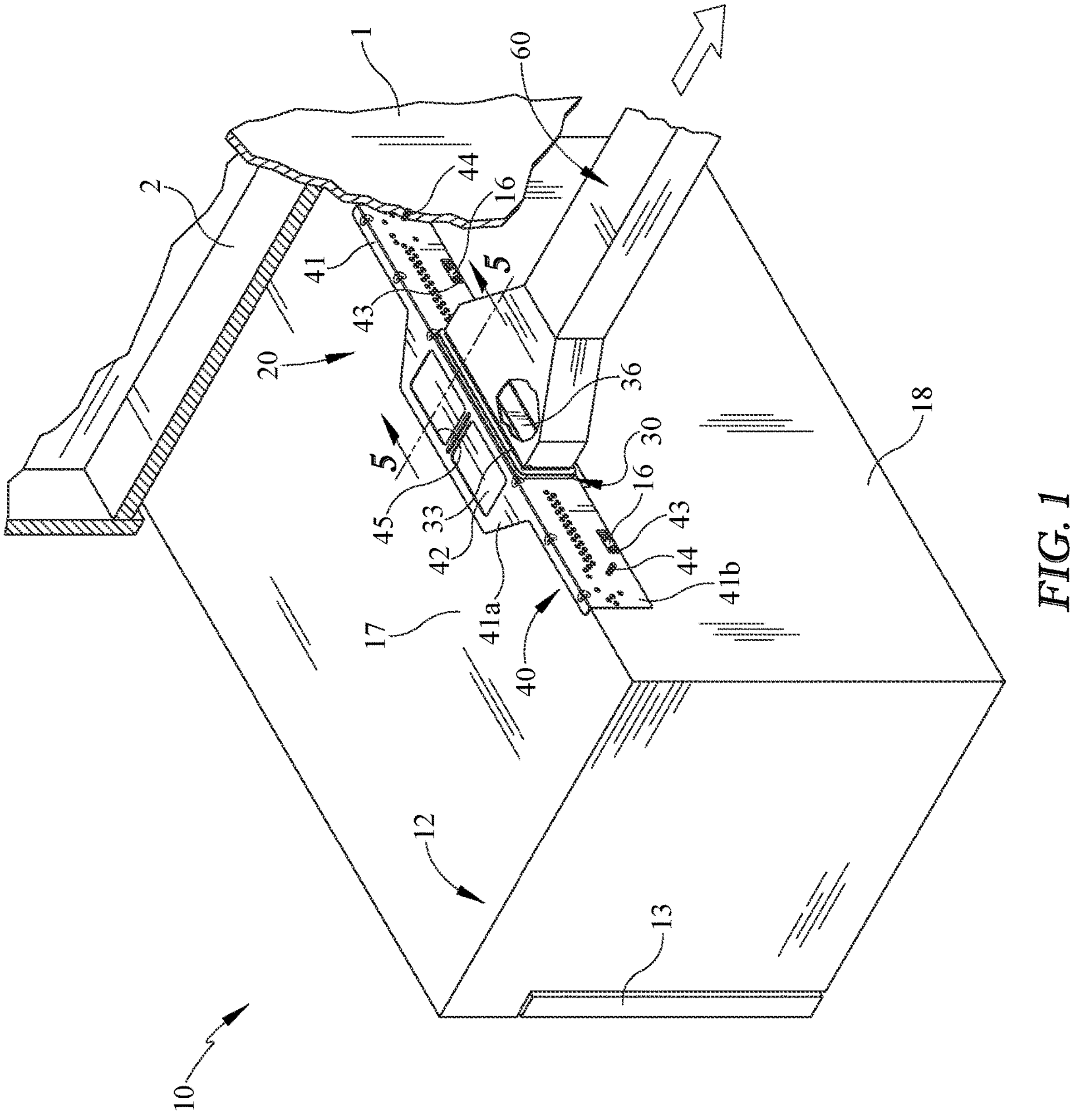
FIG. 1 is a perspective view of an embodiment of a microwave cooking appliance and a connector system engaging an external vent in a rear vent configuration, with a portion of a cabinet, wall, and the external vent broken away.
Figure 2:
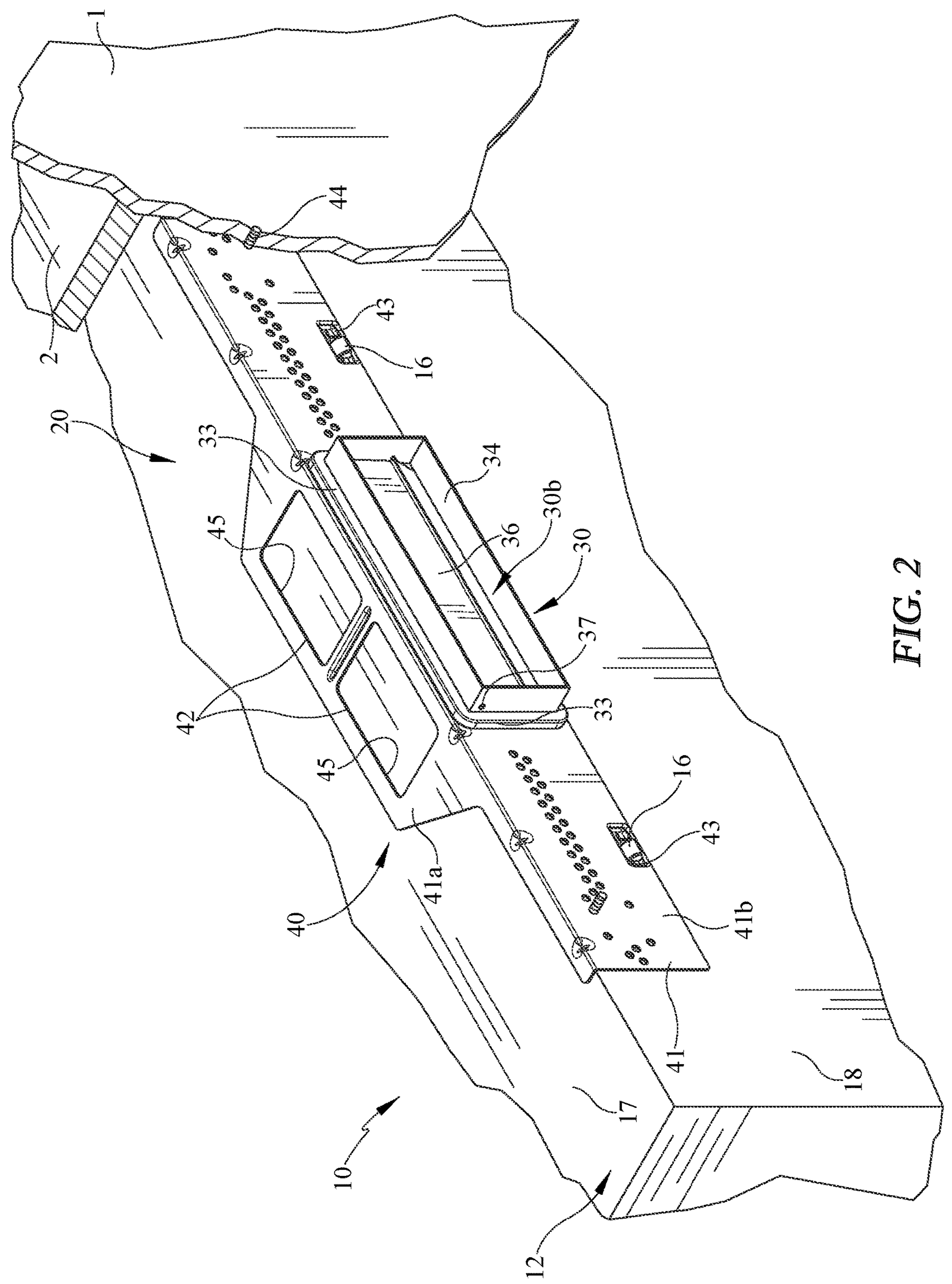
FIG. 2 is a perspective view of the microwave cooking appliance and the connector system of FIG. 1, with a portion of a cabinet and wall broken away.
Figure 3:
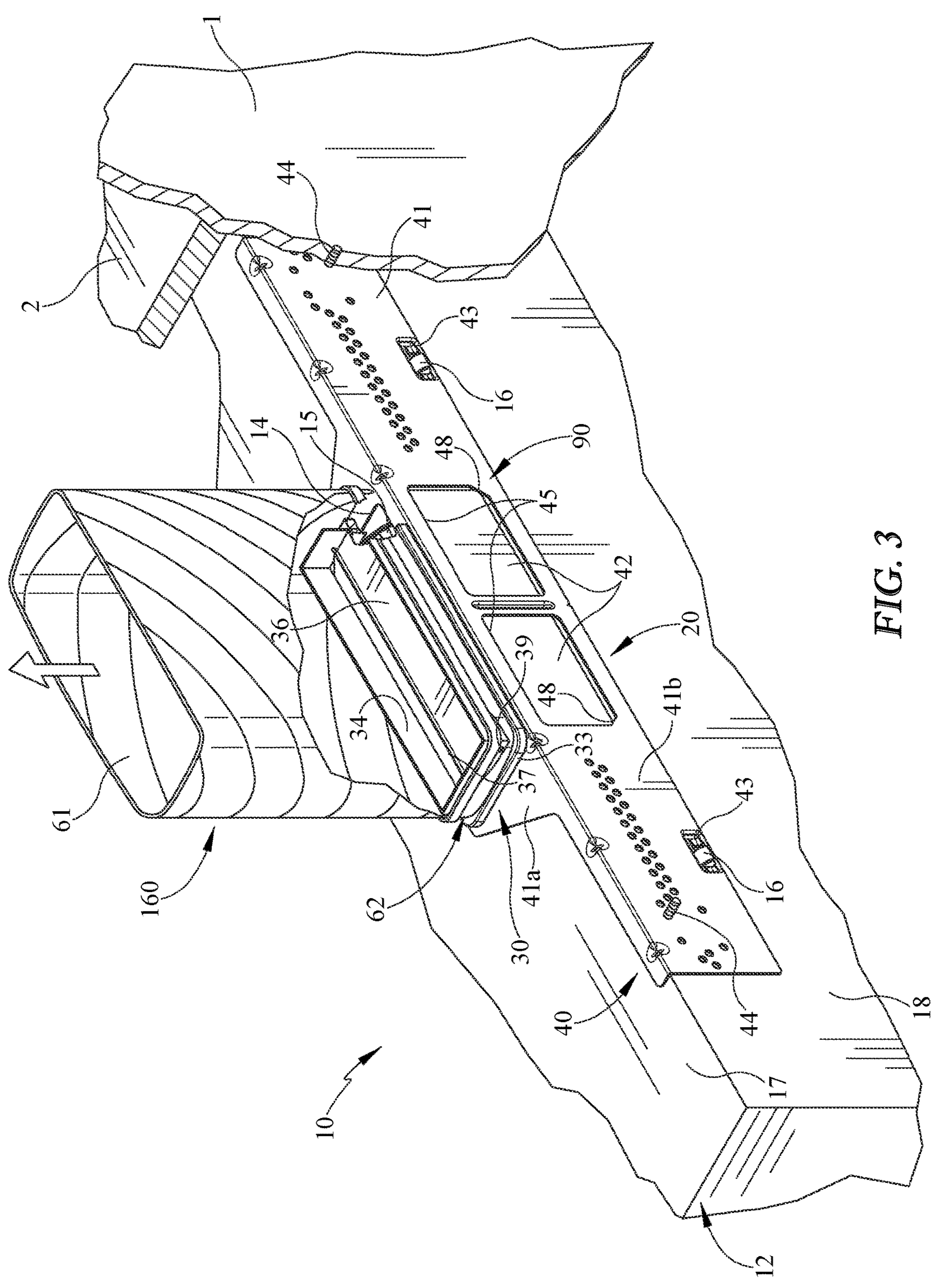
FIG. 3 is a perspective view of the microwave cooking appliance and the connector system of FIG. 1 engaging an external vent in a top vent configuration, with a portion of a cabinet, wall, and the external vent broken away.
Figure 4:
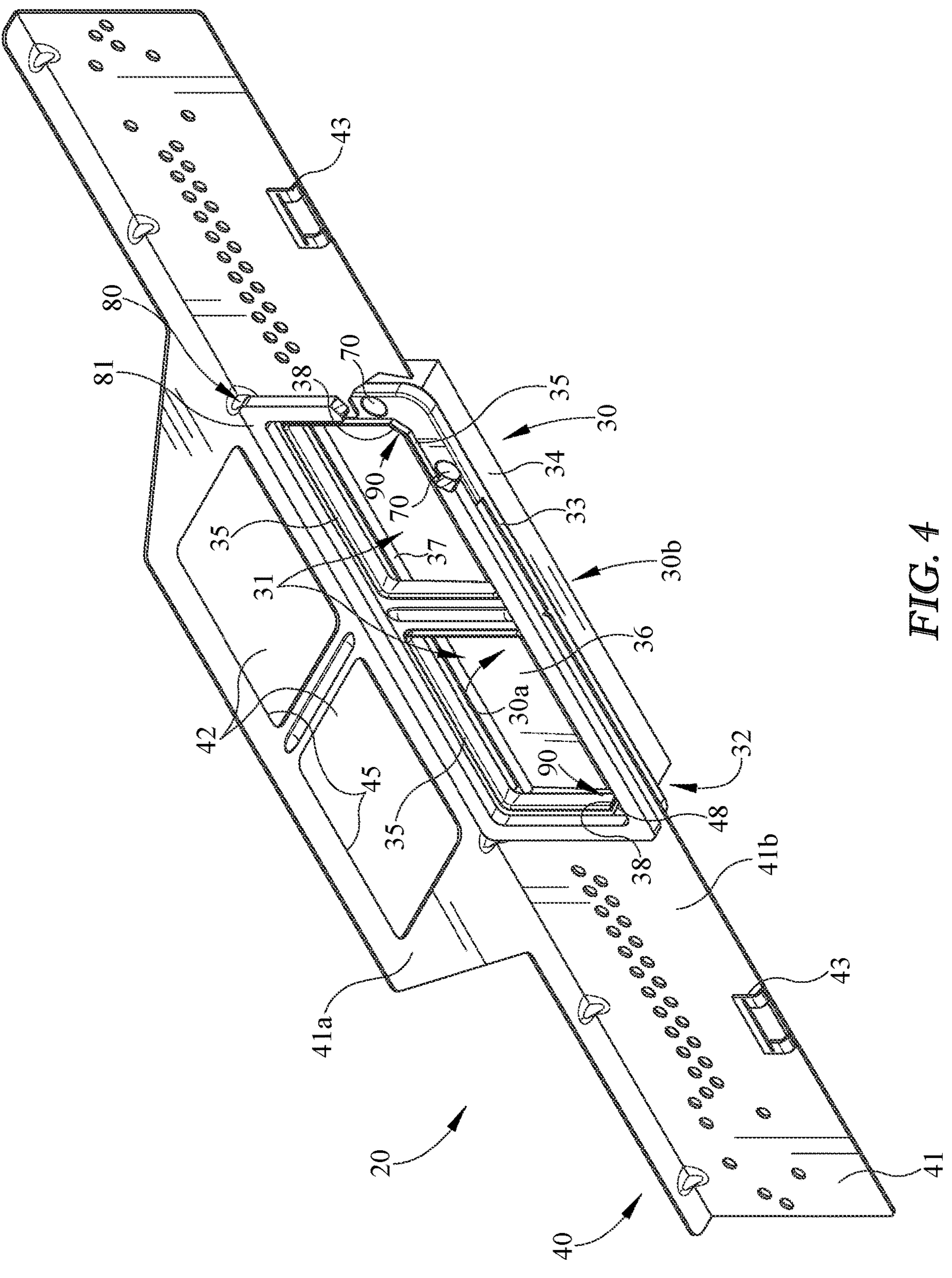
FIG. 4 is a perspective view of the connector system of FIG. 1.

The microwave cooking appliance 10 may also include one or more exhausts 14. The exhaust 14 may be positioned within the body in a variety of locations. In some embodiments, as shown in FIGS. 1, 2, and 4-6, the exhaust 14 may be positioned on the back wall 18 of the appliance 10 in a rear vent configuration. In various embodiments, as shown in FIG. 3, the exhaust 14 may be positioned on the top wall 17 of the appliance 10 in a top vent configuration. The exhaust 14 or one or more openings may be in fluid communication with an external vent 60 downstream of the appliance via an adaptor 30 or connector system 20, or portions thereof. The exhaust 14, or appliance 10, may include one or more fans 15 circulating the air flow from the appliance (e.g. exhaust) through the connector system 20 (e.g. adaptor 30, mounting bracket 40, gasket 81, etc.) and further exiting through the external vent 60, 160. The external vent 60, 160 may be a variety of shapes, sizes, quantities, constructions, and extend away from the appliance 10 in a variety of directions. For example, the external vent 60, 160 may extend through one or more walls 1 and/or cabinets 2 adjacent the appliance 10 and define a through opening 61 therein. As shown in the one embodiment in FIGS. 1 and 5, the external vent 60 may be a substantially rigid duct and/or may be rectangular in shape to attach with the adaptor 30 or portions of the connector system 20. As shown in the one embodiment in FIG. 3, the external vent 160 may be a flexible duct (e.g. in length and/or diameter/periphery defining the through opening 61) to attach with the adaptor 30 or portions of the connector system 20. In some embodiments, one or more fasteners 62 (e.g. clamp, rivet, screw, etc.) may secure the external vent to the adaptor or portions of the connector system. One example of a fastener 62, if used, as shown in FIG. 3 may be a clamp surround the periphery of both the external vent 160 and the adaptor 30, or portions thereof. The external vent may include an inlet opening 63 of the through opening 61 positioned adjacent the adaptor 30 or connector system 20 when engaged thereto.

In some implementations, the connector system 20, and portions thereof, fluidly connects the appliance exhaust 14 with the external vent 60, 160. With the connector system 20 installed to the external vent, the microwave cooking appliance 10 may be mounted to the mounting bracket 40, wall 1, or cabinet 2 thereby substantially aligning or partially aligning the exhaust 14 with the external vent 60, 160. For example, if the appliance is positionable in at least a single engagement position with the bracket as shown in the one embodiment, the connector system 20 automatically aligns the appliance exhaust or portions thereof to the external vent. The appliance 10 mounts to the mounting bracket and positions the appliance (e.g. exhaust) in alignment to the connector system 20, bracket 40, adaptor 30, sealing system 80 (e.g. gasket 81), and/or external vent 60/160 reducing the need to visibly see or manually connect the downstream structure defining the air flow away from the appliance during such manual manipulation (e.g. pivot, vertical, and/or horizontal movement) of the appliance (e.g. body, cord, fasteners, etc.). In some embodiments, the appliance 10 and/or connector system 20 may include, but is not limited to, the one or more mounting brackets 40, one or more sealing systems 80, attachment mechanisms or fasteners connecting structure therebetween or to the application, and/or one or more adaptors 30.

In some implementations, the connector system 20 and/or appliance 10 may include the adaptor 30. The adaptor 30 magnetically connects or releasably engages to the mounting bracket 40 (e.g. metal and/or magnetic body or portions thereof) of the microwave cooking appliance 10 and fluidly connects the external vent 60, 160 to the appliance 10 (e.g. at least one vent opening) and/or mounting bracket 40. In some embodiments, the adaptor 30 may connect or contact/abut the microwave cooking appliance 10, or portions thereof. The adaptor 30 may define one or more through openings 31 extending between from a first end 30*a* to an opposing second end 30*b*. The first end 30*a* may be adapted to engage the mounting bracket 40. The second end 30*b* may be adapted to engage the external vent 60, 160 (e.g. inner and/or outer periphery). The through opening 31 defining the inner periphery may be defined by a body 32 (e.g. a plate 33, a sleeve 34, and/or a flange 35, etc.) or portions of the adaptor. The plate 33 may extend outwardly or perpendicular (e.g. in a plane) from the longitudinal axis of the through opening 31 or direction between the first end 30*a* and the second end 30*b*. The flange 35 and/or sleeve 34, if used, may extend in opposing directions from the plate 33 in a perpendicular direction from the plane of the plate 33. The sleeve 34 may extend away from the plate 33 towards the second end 30*b* and/or external vent 60, 160 and may be adapted to engage/telescope the external vent (e.g. inner and/or outer periphery defining the fluid path or channel 61) or portions thereof. The flange 35 may extend away from the plate towards the first end 30*a* and/or mounting bracket 40 and may be adapted to engage the mounting bracket 40 (e.g. one or more vent openings, top vent opening, bottom vent opening) or portions thereof. The flange 35 or portion of the adaptor 30 may engage or telescope a portion of a periphery (e.g. inner 45 and/or outer) of the vent opening 42 of the mounting bracket 40. The sleeve 34 or portion of the adaptor 30 may engage or telescope into a portion of the external vent 60, 160. The telescoping engagement of the adaptor (e.g. 30*a* and/or 30*b*) may be internal or external to the periphery of the corresponding adjacent structure (e.g. mounting bracket 40, gasket 81, external vent 60, 160, appliance 10, etc.). The plate 33 may extend radially or project outwardly from the sleeve 34 and/or flange 35 (e.g. outer periphery). In some implementations, the adaptor 30, or portions thereof, may include one or more magnets 70. The plate 33 or planar body 32 may include the one or more magnets 70 surrounding, positioned about, or outside the periphery of the through opening 31 and/or periphery of the flange 35 and/or sleeve 34. The plate 33 or body 32 may include the magnets 70, if used, on at least the exterior surface facing the mounting bracket or one or more surfaces or positions. The pattern of the magnets may be about or surround the through opening 31 or be outside the flange 35. Alternatively, it should be understood that the magnets 70 may be positioned on the mounting bracket 40 and releasably engage the adaptor 30 (e.g. metal and/or magnetic body or portion thereof) or portions thereof. The adaptor 30, or portions thereof, may be made of a plastic (e.g. rated for high temperatures), although a variety of materials may be used. For example, a plastic body, plate, or portions of the adaptor may include the one or more magnets therein.

Figure 5:
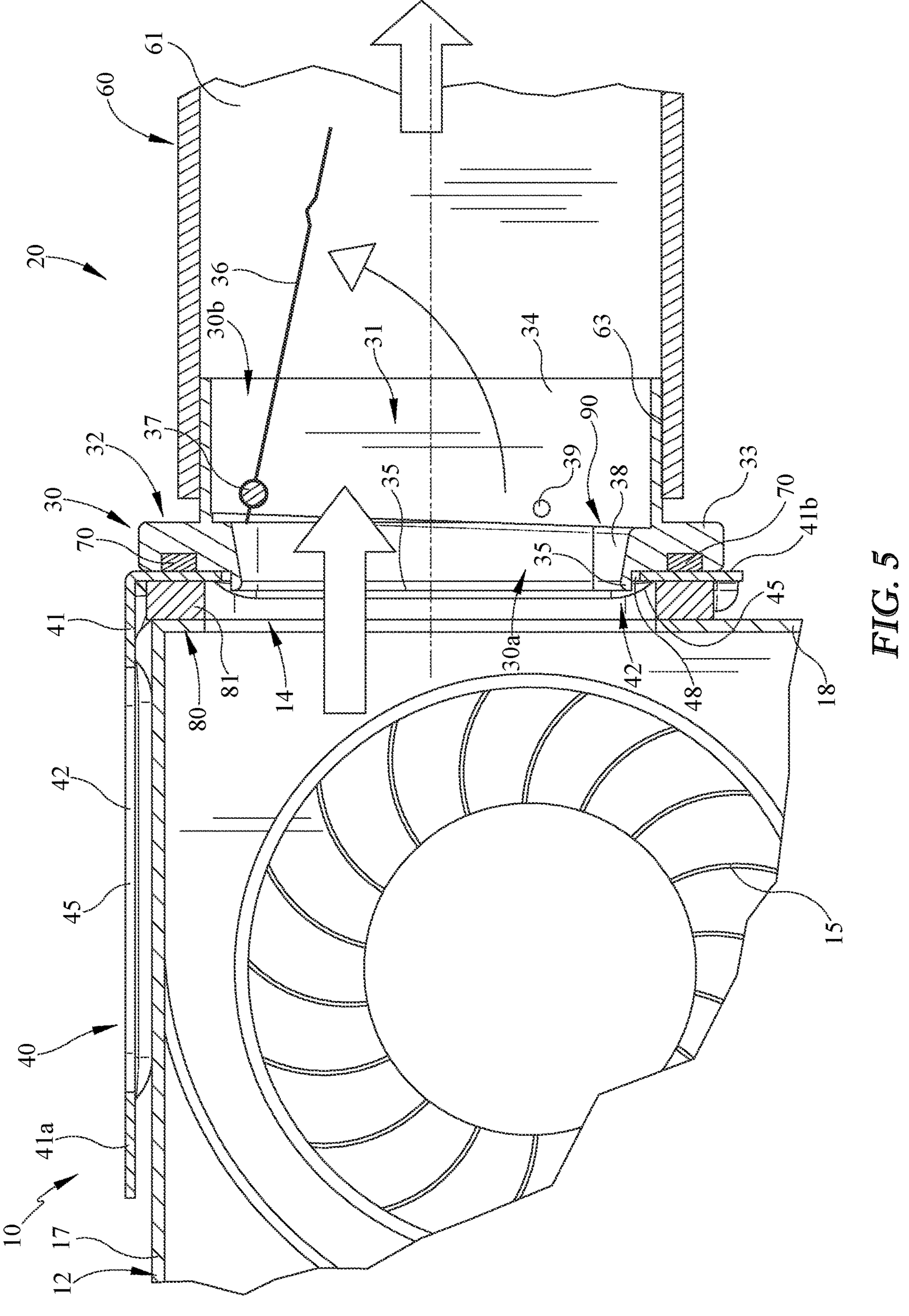
FIG. 5 is a sectional view taken along line 5-5 of FIG. 1.
Figure 6:
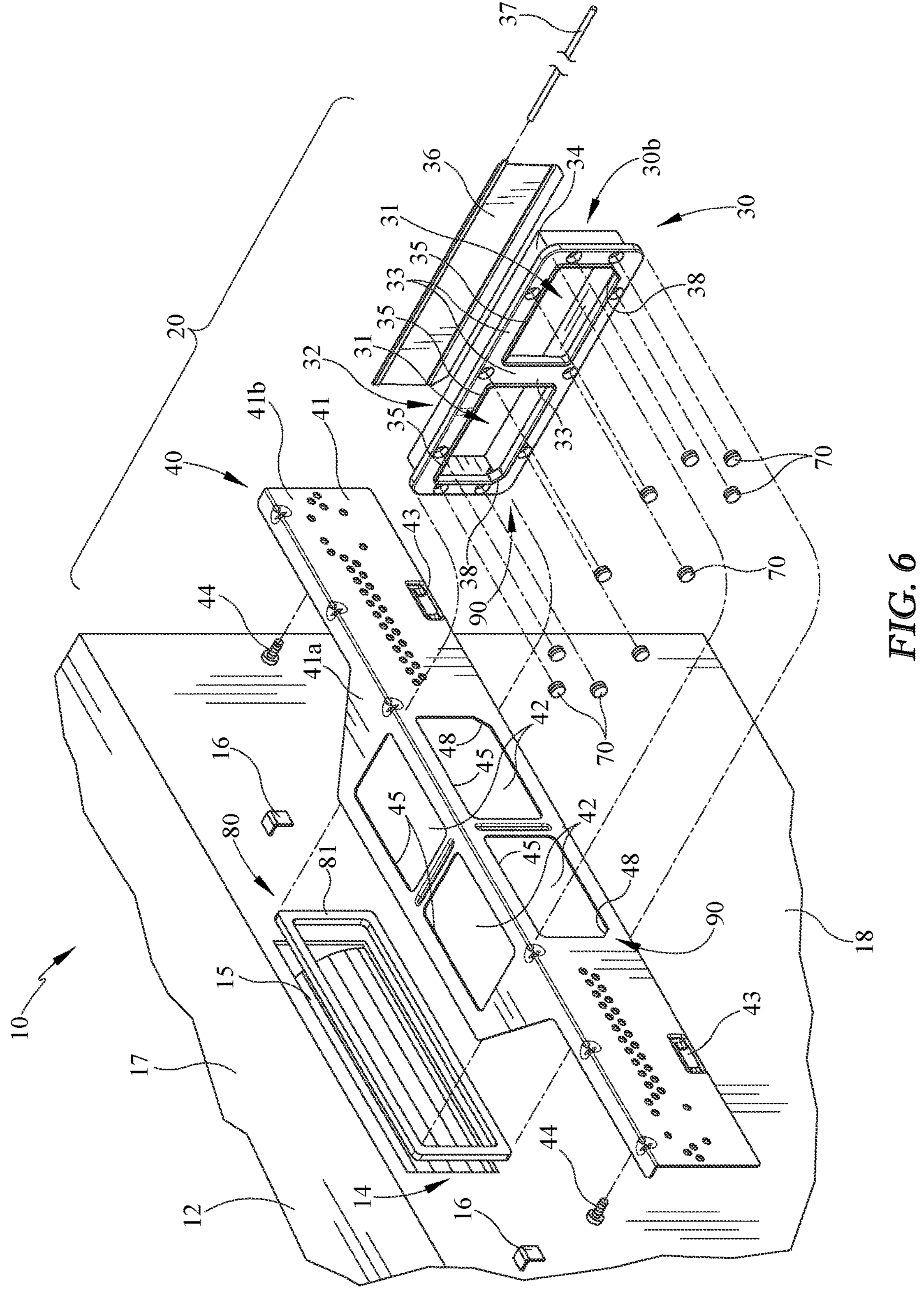
FIG. 6 is an exploded view of FIG. 1.

In some implementations, the adaptor 30, connector system 20, and/or appliance 10 may include one or more dampers 36. The dampers 36 may be positioned in the air flow path of one or more portions of the connector system 20. As shown in the one embodiment, the damper 36 is positioned within the through opening 31 of the adaptor 30. The damper 36 may be positioned between a closed position, as shown in FIGS. 2 and 3, and an open position, as shown in FIG. 5, different from the closed position. The air flow, or an increase in flow, may position the damper 36 from the closed position to the one or more open positions. When the air flow decreases, the damper 36 may return to the closed position (e.g. via gravity). In some embodiments, the damper 36 may be electronically and/or mechanically controlled between positions. In the one embodiment shown, the damper may be a plate hinged about an axis or pin 37 to the inner periphery of the adaptor to pivot between positions. The plate, distal from the hinge 37, may rest upon a stop 39 or other portions of the adaptor (e.g. inner periphery) when in the closed position.

In some implementations, the adaptor 30, connector system 20, and/or appliance 10 may include one or more sealing systems 80. One or more sealing systems 80 may be positioned between connections or engagements between the appliance 10, mounting bracket 40, adaptor 30, and/or external vent 60, 160. In the one embodiment shown, one embodiment of a sealing system 80 may be one or more gaskets 81. The gasket 81 may be positioned or compressed between the mounting bracket 40 (e.g. surrounding and/or adjacent one or more vent openings 42) and the appliance body 12 adjacent the exhaust 14. One or more gaskets 81, if used, may be positioned adjacent to one or more of the vent openings 42. A single gasket may be used at the desired vent opening, if two or more vent openings, of the mounting bracket corresponding to a top vent configuration or a rear vent configuration of the appliance/mounting bracket. In the one embodiment show in FIG. 3, the gasket 81 surrounds the top vent opening (e.g. two vent openings, one vent opening) of the bracket and is positioned between the mounting bracket 40 and the appliance/exhaust in the top vent configuration. In the one embodiment show in FIGS. 1, 2, and 4-6, the gasket 81 surrounds the rear vent opening (e.g. two vent openings, one vent opening) of the bracket and is positioned between the mounting bracket 40 and the appliance/exhaust in the rear vent configuration. The gasket may be an open celled foam in some embodiments, however a variety of materials may be used.

In some embodiments, the adaptor, connector system 20, and/or appliance 10 may include a mounting bracket to mount the microwave cooking appliance in its application. The mounting bracket 40, if used, may include the one or more vent openings 42. The mounting bracket 40 may attach the appliance 10 in its application by one or more attachment mechanisms 43 (e.g. hinge, hook, fasteners, screws, bolts, etc.). In the one embodiment shown, the attachment mechanisms 43 may be one or more hooks/fasteners. The appliance 10 may have a corresponding attachment mechanism (e.g. hook, fastener, etc.) to engage the attachment mechanism 43 of the mounting bracket 40. The mounting bracket may be secured to the wall, cabinet, or application by one or more attachment mechanisms (e.g. hinge, hook, fasteners, screws 44, bolts, etc.). With the appliance 10 secured to the mounting bracket 40, the exhaust 14 of the appliance is aligned or in fluid communication with the adaptor 30 (e.g. through opening) and/or bracket vent opening 42. The mounting bracket 40 may include a body 41 defining the one or more vent openings 42. In the one embodiment shown, the horizontal or top plate 41*a* of the body may include one or more vent openings 42 and the vertical or rear plate 41*b* may include one or more vent openings 42. It should be understood that the mounting bracket, appliance attachment, and/or vent opening may be a variety of shapes, sizes, quantities, positions, and constructions and still be within the scope of the invention. For example, the mounting bracket may have a single vent opening on the top plate or rear plate in some embodiments. The body 41 or portions thereof may be magnetic and/or of a metal to allow the one or more magnets to engage and hold the adaptor in position, fluid communication, and/or alignment. The vent opening engages or fluidly communicates with the exhaust of the appliance when the appliance is secured to the mounting bracket (e.g. attachments). The appliance may attach to the mounting bracket in a single position with the correspondence attachments, however the appliance may be adjustable in position (e.g. horizontally, vertically, etc.) relative to mounting bracket/adaptor and then be secured.

In some implementations, the adaptor 30, connector system 20, and/or appliance 10 may include one or more orientation features 90 to orient the adaptor 30 relative to the mounting bracket 40. More specifically, the orientation feature 90, if used, may orientate the damper 36, if used, of the adaptor 30 relative to the mounting bracket 40 and/or appliance 10. For example, as shown in the one embodiment in FIG. 5, when the adaptor 30 is mounted to the bracket 40 for a rear vent configuration the hinge 37 of the damper 36 may be positioned at the higher elevation to allow gravity to consistently return the damper to the closed position once opened/pivoted. One embodiment of the orientation feature 90, if used, of the adaptor 30 may be the flange 35 or periphery having one or more chamfered peripheries or edges 38 having a single or one orientation for assembly with an embodiment of the orientation feature 90 (e.g. one or more chamfered peripheries or edges 48) of the mounting bracket 40 of at least one vent opening 42 or periphery. The chamfered periphery 38 of the one or more flanges 35 and the chamfered periphery 48 of the one or more vent openings 42 engage or align with each other when the adaptor is engaged to the mounting bracket to orient the adaptor (e.g. damper or other structure of the adaptor) relative to the mounting bracket. In the one embodiment show, a top vent opening, if used, may receive the chamfered periphery of the flange regardless of the orientation feature because the chamfered periphery of the vent opening is not present. When the adaptor/damper is top mounted the damper or hinge orientation may not work counter to the gravity.

In use, the user may connect the external vent 60, 160 to the microwave cooking appliance 10 with a connector system 20. The user may be provided with a wall 1 or cabinet 2 with an external vent 60, 160 or portion thereof (e.g. distal free end) accessible to the user. The external vent 60, 160 may be in a top vent configuration and/or a rear vent configuration. The adaptor 30 may be attached to the external vent 60, 160. For example, the sleeve 34 or adaptor may be telescoped with the periphery or walls (e.g. inner or outer periphery) defining the external vent or through opening 61. In some embodiments, one or more fasteners 62 (e.g. clamp, rivet, screw, etc.), if used, may secure the external vent to the adaptor, sleeve, or portions thereof. If the external vent 60 is rigid or fixed for example, the telescoping sleeve 34 or adaptor 30 may allow the length or first end 30*a* position, opposite the external vent, flexibility to aid in adjusting the placement of the adaptor relative to the mounting bracket/external vent/appliance. If a flexible external vent 160 is used, the vent may be lengthened or shortened as needed and/or conform to the shape (e.g. rectangle, circular, etc. of the sleeve or adaptor). The user may select to top mount or rear mount the adaptor relative to the desired or predetermined vent opening of the mounting bracket and/or exhaust of the appliance. After the adaptor 30 is installed, the mounting bracket 40 may be positioned or secured with the adaptor 30. However, the adaptor 30 may be combined with the bracket 40 before attaching to the external vent 60, 160 in some embodiments. The proximity between the mounting bracket and the adaptor is decreased, such that the one or more magnets 70 of the adaptor becomes magnetically attached to the mounting bracket 40 or metal and/or magnetic body 41. The one or more through openings 31 of the adaptor 30 may be centered relative to the at least one vent opening 42. One or more of the flanges 35 may engage the periphery of the one or more vent openings 42 to center or position the adaptor/bracket. The mounting bracket or vent opening comes into alignment with the through opening or adaptor. One or more orientation features 90 (e.g. 48 and/or 38), if used, may orientate the adaptor 30 relative to the vent opening 42 of the bracket or may prevent the connection until the user corrects the orientation of the adaptor. The user may attach the mounting bracket to the wall 1, cabinet 2, or other application structure. A variety of fasteners 44 may be used to mount the mounting bracket 40 such as, but is not limited to, bolts, screws, clips, etc. In the one embodiment shown, the user may lift the microwave cooking appliance 10, tilt it forward, and hook the back edges/hooks 16 of the appliance onto the tabs/hooks 43 of the mounting bracket. The appliance 10 may be rotated up against the cabinet bottom and secured via fasteners (e.g. bolts, screws, clips, etc.). With the microwave cooking appliance 10 mounted to the bracket, the exhaust of the appliance is aligned (e.g. automatically) with the through opening 31 of the adaptor 30 already attached to the bracket 40 and connected with the external vent. In some embodiments, the connector system may be sealed. As shown in the one embodiment, a gasket, if used, may seal the microwave cooking appliance to the mounting bracket. The user may place or position the one or more gaskets 80 on the relative vent opening(s) being used, between the appliance and the mounting bracket, to be compressed when the appliance is secured to the mounting bracket/application. The gasket may have an adhesive or other fastener to hold in position to the mounting bracket. In some embodiments, the one or more gaskets, if used, may be already be in position with or attached to the mounting bracket.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It is to be understood that the embodiments are not limited in its application to the details of construction and the arrangement of components set forth in the description or illustrated in the drawings. The invention is capable of other embodiments and of being practiced or of being carried out in various ways. Unless limited otherwise, the terms "connected," "coupled," "in communication with," and "mounted," and variations thereof herein are used broadly and encompass direct and indirect connections, couplings, and mountings. In addition, the terms "connected" and "coupled" and variations thereof are not restricted to physical or mechanical connections or couplings.

The foregoing description of several embodiments of the invention has been presented for purposes of illustration. It is not intended to be exhaustive or to limit the invention to the precise steps and/or forms disclosed, and obviously many modifications and variations are possible in light of the above teaching.

The invention claimed is:

1. A microwave cooking appliance having a connector system comprising:

the microwave cooking appliance having an exhaust and one or more first attachment mechanisms;

a mounting bracket includes one or more second attachment mechanisms adapted to engage the one or more first attachment mechanisms to mount the microwave cooking appliance on the mounting bracket, wherein the mounting bracket includes a magnetic body, wherein the magnetic body of the mounting bracket includes an appliance-facing surface and an opposing wall-facing surface, and wherein the magnetic body includes at least one vent opening to engage the exhaust of the microwave cooking appliance;

an adaptor having a first end and an opposing second end, a through opening extends through the first end and the opposing second end, and one or more magnets;

wherein the one or more magnets adjacent the first end of the adaptor releasably engages the first end of the adaptor to the opposing wall-facing surface of the magnetic body of the mounting bracket and the opposing second end of the adaptor is configured to engage an external vent, when the adaptor is engaged with the mounting bracket, the through opening of the adaptor is in fluid communication with the at least one vent opening of the mounting bracket;

wherein the adaptor includes a plate in a plane, wherein the plate includes a sleeve extending away from the plate in a first direction perpendicular to the plane away from the first end of the adaptor, wherein the sleeve is adapted to engage the external vent, and wherein the plate includes a flange extending away from the plate in a second direction perpendicular to the plane opposite to the first direction away from the second end of the adaptor, wherein the flange includes an inner periphery defining the through opening and an outer periphery, wherein the outer periphery of the flange engages an inner periphery of the at least one vent opening of the mounting bracket, and wherein the plate includes the one or more magnets; and wherein the outer periphery of the flange projecting from the adaptor includes a first chamfered periphery and wherein the inner periphery of the at least one vent opening of the mounting bracket includes a second chamfered periphery, and when the adaptor is engaged with the mounting bracket, the first chamfered periphery and the second chamfered periphery align to orient the adaptor relative to the mounting bracket in a single orientation and prevents the adaptor from assembling with the mounting bracket in orientations different from the single orientation.

2. The microwave cooking appliance of claim 1 further comprising at least one gasket, wherein the at least one gasket surrounds the at least one vent opening and is positioned between the appliance-facing surface of the magnetic body of the mounting bracket and the microwave cooking appliance.

3. The microwave cooking appliance of claim 1 wherein the adaptor includes a plastic body with the one or more magnets positioned therein.

4. The microwave cooking appliance of claim 1 further comprising at least one damper positioned within the through opening of the adaptor.

5. The microwave cooking appliance of claim 1 wherein the sleeve telescopes with the external vent and the flange telescopes with the inner periphery of the at least one vent opening of the mounting bracket.

6. The microwave cooking appliance of claim 1 wherein the first end of the adaptor directly engages the opposing wall-facing surface of the magnetic body of the mounting bracket when installed and the opposing second end of the adaptor directly engages the external vent when installed.

7. The microwave cooking appliance of claim 1 wherein the mounting bracket includes a top plate and a rear plate, wherein the top plate includes the magnetic body defining a top vent opening of the at least one vent opening, the appliance-facing surface, and the opposing wall-facing surface, and wherein the rear plate includes the magnetic body defining a bottom vent opening of the at least one vent opening, the appliance-facing surface, and the opposing wall-facing surface.

8. The microwave cooking appliance of claim 7 wherein the rear plate and the top plate are substantially perpendicular to each other.

9. A microwave cooking appliance having a connector system comprising:

the microwave cooking appliance having an exhaust and one or more first attachment mechanisms;

a mounting bracket includes one or more second attachment mechanisms adapted to engage the one or more first attachment mechanisms to mount the microwave cooking appliance on the mounting bracket, a top plate, and a rear plate, wherein each one of the top plate and the rear plate of the mounting bracket includes a magnetic body defining at least one vent opening to engage the exhaust of the microwave cooking appliance;

an adaptor having a plate, a sleeve, and a flange defining a through opening, wherein the sleeve projects from the plate towards an external vent in a first direction and the flange projects away from the plate towards the mounting bracket in a second direction opposite to the first direction, wherein the flange includes an inner periphery defining the through opening and an outer periphery, wherein the outer periphery of the flange engages an inner periphery of the at least one vent opening of the mounting bracket, and the plate includes one or more magnets;

wherein the one or more magnets of the adaptor releasably engages the flange to the magnetic body of the top plate or the rear plate of the mounting bracket and the sleeve of the adaptor is configured to engage the external vent, when the adaptor is engaged with the mounting bracket, the exhaust of the microwave cooking appliance is in fluid communication with the external vent via the through opening of the adaptor and the at least one vent opening; and wherein the outer periphery of the flange of the adaptor and the inner periphery of the at least one vent opening of the mounting bracket include at least one orientation feature to orient the adaptor in a single orientation relative to the mounting bracket when assembled preventing the adaptor from assembling with the mounting bracket in orientations different from the single orientation.

10. The microwave cooking appliance of claim 9 further comprising at least one gasket, wherein the at least one gasket surrounds the at least one vent opening and is positioned between the mounting bracket and the microwave cooking appliance.

11. The microwave cooking appliance of claim 9 wherein the adaptor includes a plastic body with the one or more magnets positioned therein.

12. The microwave cooking appliance of claim 9 further comprising at least one damper positioned within the through opening of the adaptor.

13. The microwave cooking appliance of claim 9 wherein the outer periphery of the flange engages an entire inner periphery of the at least one vent opening of the mounting bracket.

14. The microwave cooking appliance of claim 9 wherein the at least one orientation feature of the outer periphery of the flange includes a first chamfered periphery and wherein the at least one orientation feature of the inner periphery of the at least one vent opening of the mounting bracket includes a second chamfered periphery, and when the adaptor is engaged with the mounting bracket in the single orientation, the first chamfered periphery and the second chamfered periphery align to orient the adaptor relative to the mounting bracket.

15. The microwave cooking appliance of claim 9 wherein the plate includes the one or more magnets positioned radially outside the outer periphery of the flange.

16. The microwave cooking appliance of claim 9 wherein the adaptor does not directly engage the microwave cooking appliance when installed.

17. The microwave cooking appliance of claim 9 wherein the magnetic body of the top plate defines a top vent opening of the at least one vent opening and the magnetic body of the rear plate defines a bottom vent opening of the at least one vent opening.

18. The microwave cooking appliance of claim 9 wherein the magnetic body of the top plate is substantially perpendicular to the magnetic body of the rear plate.

19. The microwave cooking appliance of claim 9 wherein the outer periphery of the flange telescopes in the second direction against the inner periphery of the at least one vent opening of the mounting bracket and the sleeve telescopes in the first direction with the external vent.

20. A microwave cooking appliance having a connector system comprising:

the microwave cooking appliance having an exhaust and one or more first attachment mechanisms;

a mounting bracket includes one or more second attachment mechanisms adapted to engage the one or more first attachment mechanisms to mount the microwave cooking appliance on the mounting bracket, wherein the mounting bracket includes a magnetic body, wherein the magnetic body of the mounting bracket includes an appliance-facing surface and an opposing wall-facing surface, and wherein the magnetic body includes at least one vent opening to engage the exhaust of the microwave cooking appliance;

an adaptor having a first end and an opposing second end, a through opening extends through the first end and the opposing second end, and one or more magnets;

wherein the one or more magnets adjacent the first end of the adaptor releasably engages the first end of the adaptor to the opposing wall-facing surface of the magnetic body of the mounting bracket and the opposing second end of the adaptor is configured to engage an external vent, when the adaptor is engaged with the mounting bracket, the through opening of the adaptor is in fluid communication with the at least one vent opening of the mounting bracket;

wherein the adaptor includes a plate in a plane, wherein the plate includes a sleeve extending away from the plate in a first direction perpendicular to the plane away from the first end of the adaptor, wherein the sleeve is adapted to engage the external vent, and wherein the plate includes a flange extending away from the plate in a second direction perpendicular to the plane opposite to the first direction away from the second end of the adaptor, wherein the flange includes an inner periphery defining the through opening and an outer periphery, wherein the outer periphery of the flange engages an inner periphery of the at least one vent opening of the mounting bracket, and wherein the plate includes the one or more magnets; and wherein the mounting bracket includes a top plate and a rear plate, wherein the top plate includes the magnetic body defining a top vent opening of the at least one vent opening, the appliance-facing surface, and the opposing wall-facing surface, and wherein the rear plate includes the magnetic body defining a bottom vent opening of the at least one vent opening, the appliance-facing surface, and the opposing wall-facing surface.

* * * * *